United States Patent [19]

McArdle

[11] 4,370,519

[45] Jan. 25, 1983

[54] AUTOKEY GENERATOR FOR SECRET COMMUNICATION SYSTEM

[75] Inventor: Beryl L. McArdle, Rochester, N.Y.

[73] Assignee: General Dynamics Corporation, San Diego, Calif.

[21] Appl. No.: 131,436

[22] Filed: Dec. 6, 1949

[51] Int. Cl.³ .......................... H04L 9/00; H04L 7/08
[52] U.S. Cl. .............................. 178/22.14; 178/22.13; 179/1.5
[58] Field of Search ........ 250/27 GT, 27 CL, 27 TR, 250/27 PSL, 27 SW, 6.6, 27 T, 27 CC, 27 PSC, 27.1-27.35; 178/22, 43.5, 69.5, 22.14; 179/1.5, 15.6, 15.6 PCM; 235/61 SEPB, 61 EPE

[56] References Cited

U.S. PATENT DOCUMENTS

| | | |
|---|---|---|
| 1,522,775 | 1/1925 | Friedman . |
| 2,139,676 | 12/1938 | Friedman . |
| 2,359,649 | 10/1944 | Kahn et al. . |
| 2,404,047 | 7/1946 | Flory et al. . |
| 2,451,632 | 10/1948 | Oliver . |
| 2,487,603 | 11/1949 | Sceoles . |
| 2,487,682 | 11/1949 | Wendt . |
| 2,514,671 | 7/1950 | Rack . |
| 2,517,587 | 8/1950 | Mohr ................................. 179/1.5 |
| 2,536,917 | 1/1951 | Dickinson . |
| 2,539,014 | 1/1951 | Frantz . |
| 2,570,716 | 10/1951 | Rochester . |
| 2,579,302 | 11/1951 | Carbrey . |
| 2,580,771 | 1/1952 | Harper . |
| 2,602,889 | 7/1952 | Post . |

FOREIGN PATENT DOCUMENTS 960862  11/1949  France .

OTHER PUBLICATIONS

Meaehaml Peterson: An Experimental Multichannel Pulse Code, etc; Bell System Tech Jour. (V48), vol. 27, pp. 1-43.

Primary Examiner—Salvatore Cangialosi

EXEMPLARY CLAIM

1. An autokey generator adapted for use in a secret communication system, comprising the combination of a source of binary digit pulse intelligence signals in digital mark-space from having a predetermined number of digital pulse intervals in each intelligence signal interval; a plurality of bistable switch means connected in sequence, each said switch means having a tripped state and a reset state, a source of reset signals connected to each of said switch means, said reset signals occurring at the end of each digit interval; means for tripping the first said switch means in response to the receipt of a mark pulse from said source of intelligence signals; means for setting each said switch means, except the first, in accordance with the state of the preceding said switch means upon the receipt of a said reset pulse, each said switch means having at least a pair of output terminals furnishing output signals of opposite polarity; diode matrix means having a plurality of output terminals, responsive to the respective outputs of said switch means for energizing individual ones of said output terminals in correspondence with particular combinations of output signals from said switch means, said matrix means being operated to pass said output signals from said switch means to one of said output terminals at a given instant, depending uniquely upon the configuration of polarities then present on said output terminals of said switch means, an autokey code output terminal, and means for connecting fewer than all of said output terminals of said matrix means in parallel to said autokey code output terminal, whereby said autokey code appearing on said autokey code output terminals contains a pattern of pulses determined by, but different from, the pattern of pulses appearing in said intelligence signals.

4 Claims, 8 Drawing Figures

AUTOKEY GENERATOR FOR SECRET COMMUNICATION SYSTEM

This invention relates to secret communication systems, and more particularly to systems for such communications which are adapted to provide secrecy both against casual interception and against deciphering which could result in later understandability of the transmitted intelligence.

It is well known that a voltage wave varying in time to represent intelligence, as for example speech, may be conveyed from a transmitter to a receiver by means of a series of discrete samples of the amplitude of the voltage wave, provided the interval between these samples is not too great with respect to the frequency of the intelligence signal to be transmitted, and provided the samples are reproduced in the receiver with their original order and spacing. It has been found in practice that the maximum space separation of the samples is determined primarily by the maximum rate of change of the voltage wave to be transmitted, that is, by the amount of detail in the voltage wave to be transmitted. Under optimum conditions the frequency of sampling should be not less than approximately twice the maximum frequency in the intelligence signal which is to be transmitted. For a voice communication system, for example, a sampling rate of 6,250 times per second is adequate to transmit frequencies up to approximately 3,000 cycles per second. Each sample need only be of sufficient duration to establish the amplitude of the intelligence voltage wave at the sampling instant.

Instead of transmitting the samples of the intelligence wave directly or utilizing them directly to modulate a carrier-wave or other type of transmitter, the samples may be converted into a suitable numerical code, as for example a binary code, in such a manner that each sample is represented by a set or group of marks or spaces, each occupying a definite interval of time and hereinafter referred to as a binary digit. In other words, successive samples are converted into pulse sets or groups comprising an on-off wave or pulse train, the pulses being designated marks and the off intervals spaces. In a particular example, the intelligence wave may be sampled at a rate of 6,250 times per second, quantized to the nearest of 16 discrete amplitude levels, and utilized to generate a code comprising sets of four binary digits. A system of this type requires the transmission of 25,000 binary digits per second, this value representing the minimum number necessary to provide a transmission channel for speech of reasonably good fidelity.

Transmitting intelligence from a transmitter to a receiver in accordance with the principles outlined above will provide a pulse code system with minimum bandwidth requirements but devoid of any provision for secrecy. The problem for which the present invention provides a solution is to transmit such coded intelligence signals in a manner effectively preventing their unauthorized interception and reconversion to a signal corresponding with the original intelligence signal. It is a principal object of the present invention, therefore, to provide an improved secret communication system.

Another object of the present invention is to provide a secret communication system which is readily adjusted to provide a desired degree of security, depending upon the available space and weight limits and upon the time interval following transmission of a message during which its decipherment would be advantageous.

Still another object of the present invention is to provide a secret communication system in which the apparatus required for a given degree of security is compact and of light weight.

In accordance with the present invention the intelligence signal wave is sampled periodically at suitably spaced intervals. These samples are utilized to develop a train of binary digits comprising marks and spaces. This pulse train is combined with a second train of marks and spaces which has been randomly developed in accordance with the noise components accompanying the intelligence signal. The resultant combined pulse train is transmitted to and received at a remote point. At the latter terminal, arrangements are provided for developing from the combined transmitted pulse train an intelligence signal wave substantially corresponding with the originally transmitted intelligence signal wave. Means are also provided at the receiving terminal for initially establishing and for maintaining proper synchronization between the transmitting terminal and the receiving terminal.

It is also contemplated as a part of the present invention that the above-mentioned combined pulse train may be subjected to one or more additional combinations with randomly developed auxiliary pulse trains for the purpose of further enhancing the degree of secrecy obtained. When this is done at the transmitter, a corresponding additional stage or stages is provided at the receiver.

Any desired arrangement may be employed to link the transmitter and the receiver together. For example, the output at the transmitter may serve to modulate or control a transmitter of ultrahigh-frequency energy and a suitable receiver and demodulator provided at the receiving end. Instead of a radio link, it is within the scope of the present invention to convey coded intelligence signals to a remote point by a wire line, a transmission line, a coaxial line, or otherwise.

The above and other objects and features of the present invention will be better understood by referring to the following description taken in connection with the accompanying drawings, in which like components are designated by like reference numerals and in which.

Figure 3:
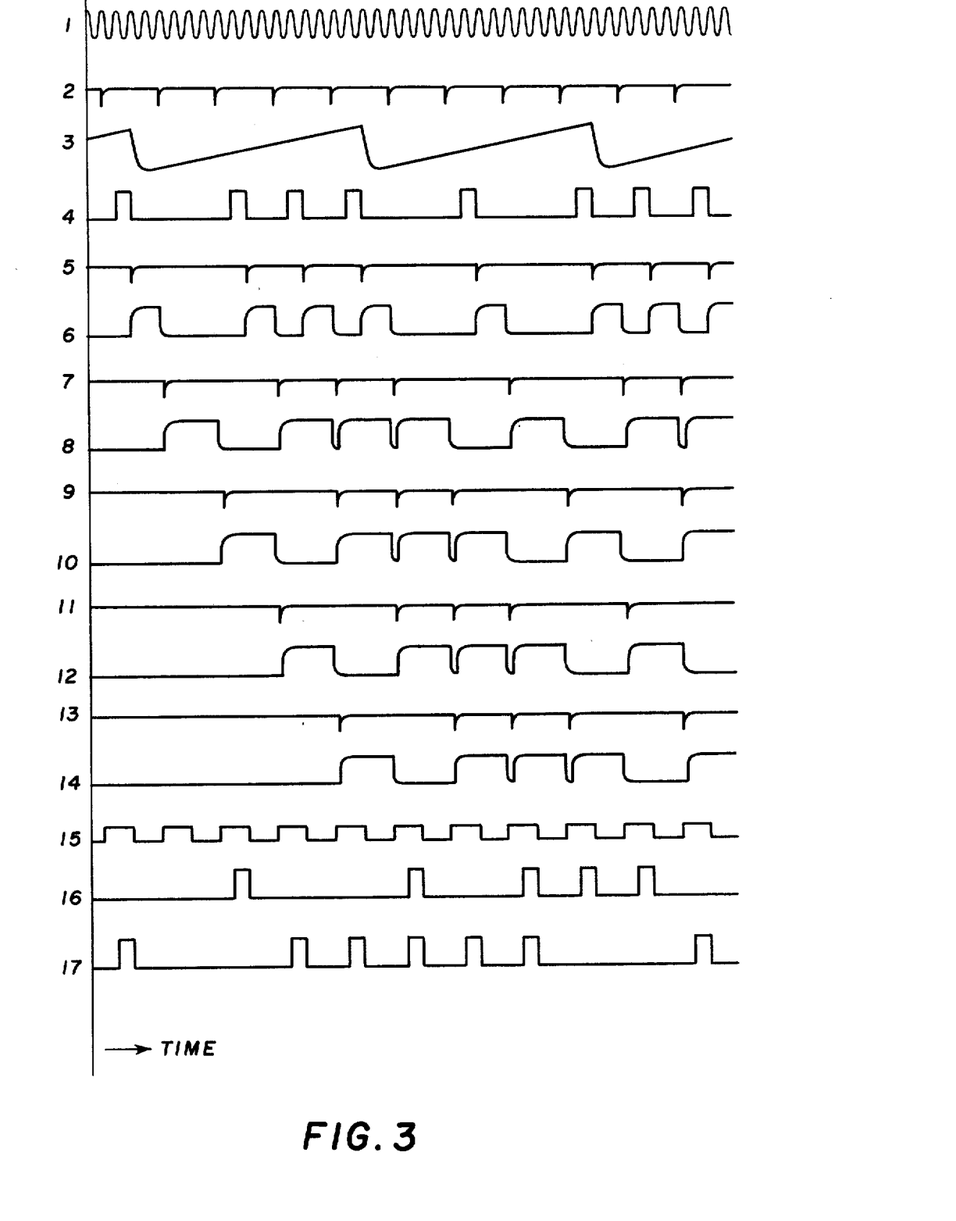
FIG. 3 is a graphical representation, to a common time base, of the waveforms which exist in various portions of the system of FIGS. 1 and 2.
Figure 7:
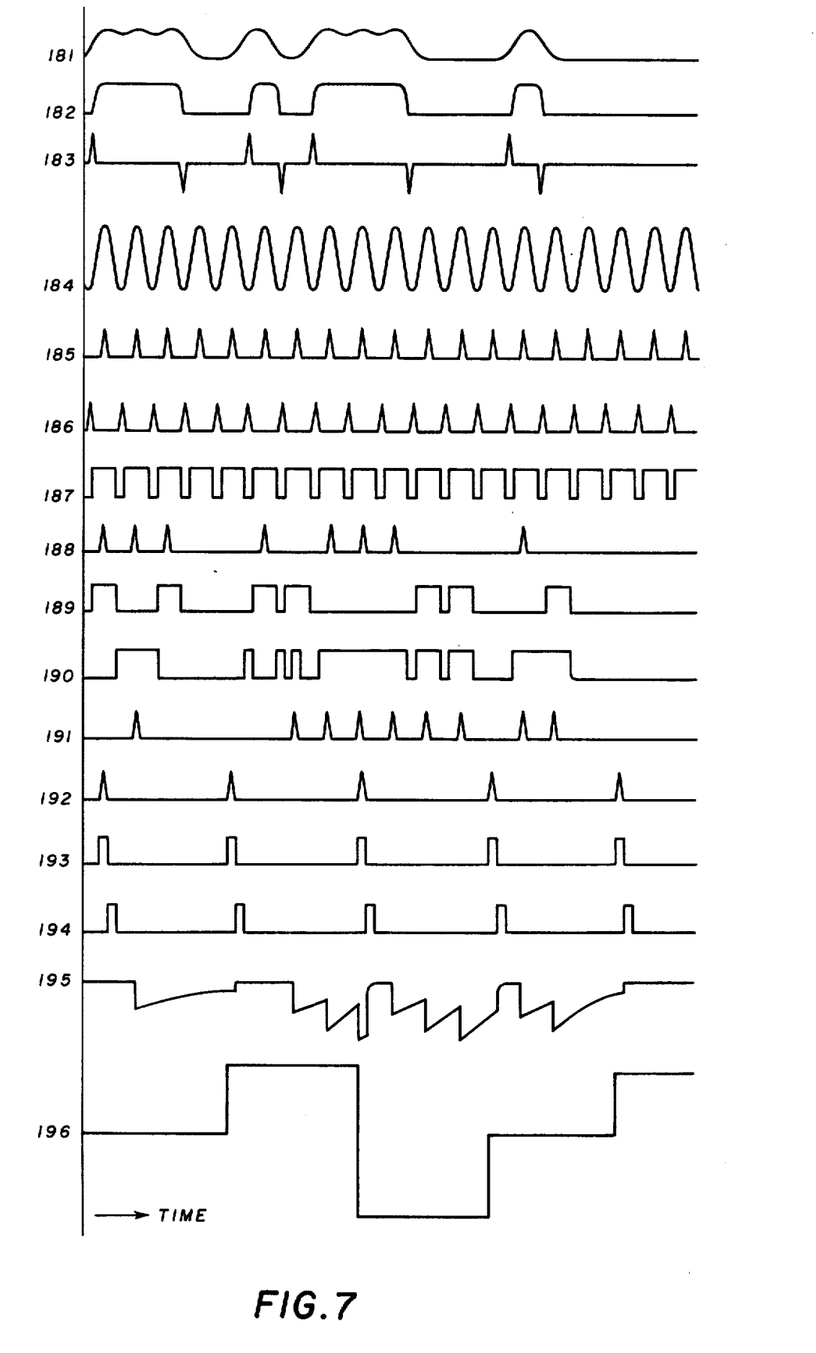
FIG. 7 is a graphical representation, to a common time base, of the waveforms which exist in various portions of the system of FIG. 6.

In the drawings, the encircled reference numerals refer to the corresponding approximate curves or wave shapes of FIGS. 3 and 7. Reference will be made to those curves throughout the following description as an aid to a better understanding of the operation of the present invention. Solely for the purpose of illustration, it will be assumed that the system shown in the drawings and about to be described is intended for the transmission of a voice signal having frequencies up to approximately 3,000 cycles per second, that this intelligence wave will be sampled at a rate of 6.25 kilocycles per second, that it will be quantized to the nearest of 16 discrete amplitude levels, and that the resultant signal will be utilized to generate a code comprising sets of four binary digits, these digits occurring at the rate of 25,000 per second and each having a width of approximately 10 microseconds. It will be understood that any or all of these specific values, here chosen for illustration, may be varied over wide limits without departing from the scope of the present invention.

THE TRANSMITTING SYSTEM

Figure 1:
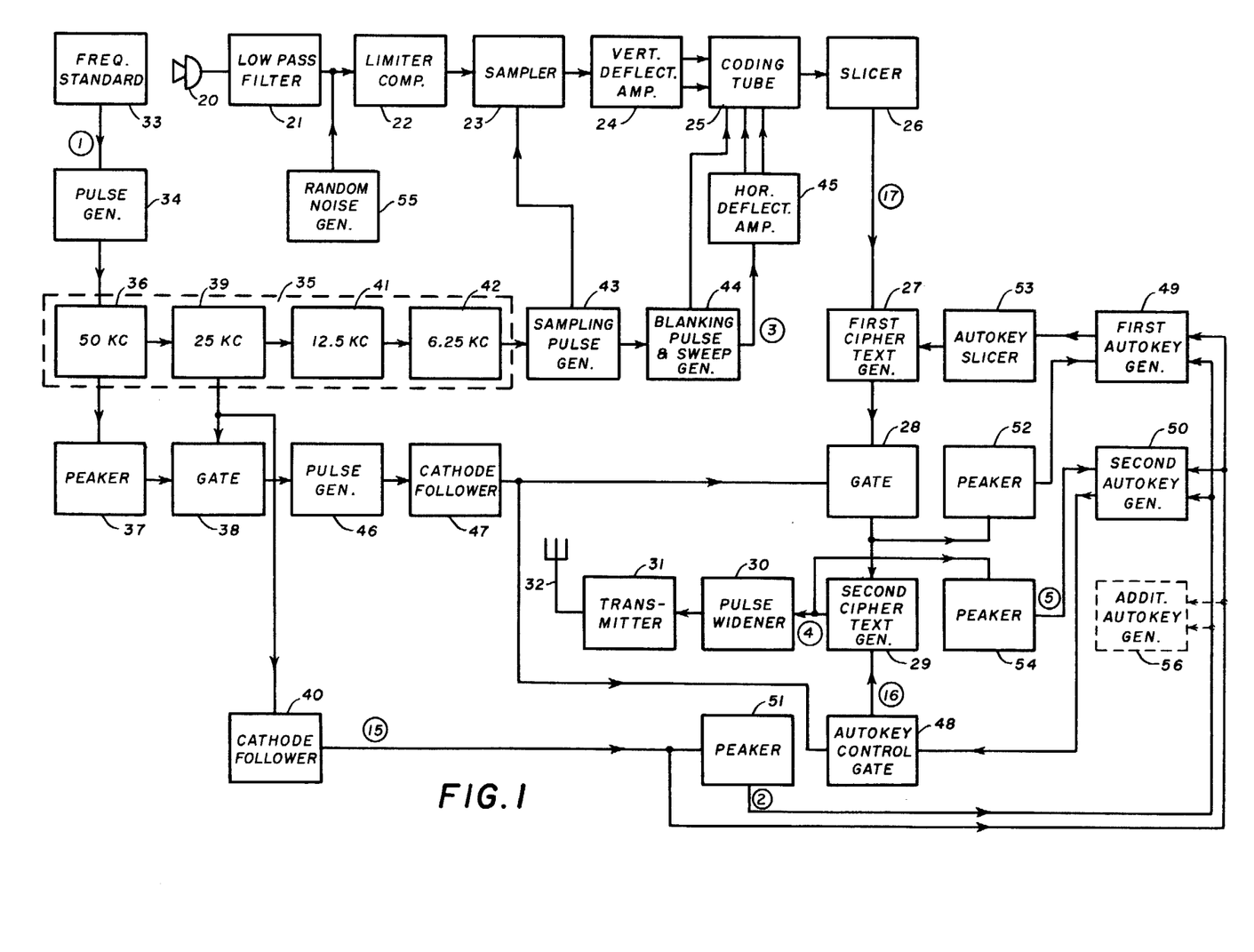
FIG. 1 is a block diagram of a system, in accordance with the present invention, at the transmitting terminal.

Referring now to the drawings, there is shown in FIG. 1 a block diagram of a system, in accordance with the present invention, for use at the transmitting terminal. The intelligence signal path will first be traced from the point where the signal is sound energy to the point where it is radiated from the transmitter. A transducer or microphone 20 is provided for converting the sound energy to be transmitted into an intelligence signal wave. This wave is passed through a low-pass filter 21 having a cutoff frequency, for example, of 3,000 cycles per second. The output of filter 21 passes through a limiter-compressor unit 22, the output of which in turn is sampled in unit 23 at suitable intervals, as for example at the rate of 6.25 kilocycles per second. The output of sampling unit 23 is supplied to a vertical deflection amplifier 24, which in turn energizes the vertical deflection plates of a coding tube in unit 25. The function of this tube is to convert the samples of the intelligence signal into a digital representation. This representation may have any one of 16 discrete amplitude levels, and for any one of these levels has the form of a set of binary digits of equal time duration, each of which may be a mark or a space. A coding tube of a type suitable for use in the present system is described in Sears U.S. Pat. No. 2,458,652 issued Jan. 11, 1949. In this connection reference is also made to Meacham U.S. Pat. No. 2,473,691 issued June 21, 1949.

The output of coding tube 25, after being subjected to pulse shaping in slicer unit 26, comprises a pulse train which may be referred to as the plain text binary code, and is illustrated by curve 17 of FIG. 3 of the drawings. This plain text binary code is supplied to a first cipher text generator 27, in which it is combined with a first autokey code developed in a manner later to be described. The circuit of first cipher text generator 27 is so designed that as a mark or a space occurs in both signal and key codes simultaneously, no output, and hence a space, is obtained. If a mark is present in the signal code simultaneously with a space in the key code, or vice versa, an output mark is obtained. In other words, likes in both signal and key codes produce no output, represented by a space, whereas unlikes produce an output, represented as a mark.

The output of first cipher text generator 27, which may be referred to as the first coded text code, is gated in gate unit 28 for the purpose of obtaining a pulse which is discrete in time, and is then supplied to a second cipher text generator 29, in which it is combined with a second autokey code, developed in a manner to be described later. The output of second cipher text generator 29 may be designated the second coded text code, and it is illustrated by curve 4 of FIG. 3.

This second coded text code is passed through a pulse widener unit 30, the output of which in turn is utilized to modulate a transmitter 31 which may be of any suitable type adapted to handle the required bandwidth. The purpose of unit 30 is to widen the pulses to the full width of the time interval, thus effectively decreasing the required transmitter bandwidth. The output of transmitter 31 energizes a radiator 32 for supplying energy to the remainder of the system located at the receiving terminal.

For the purpose of providing the necessary periodic control signals, there is provided a standard frequency oscillator 33 which may operate, for example, at a frequency of 100 kilocycles per second. The output of this unit, as represented by curve 1 of FIG. 3, energizes a pulse generator 34, the output of which is subjected to a plurality of steps of frequency division in a frequency divider generally indicated at 35. Unit 35 includes a first frequency divider 36, the output of which is passed through a peaker 37 and supplied to a gate 38. A second frequency divider 39 is energized from divider 36 and supplies its output to gate 38 and to a cathode follower unit 40. Frequency dividers 41 and 42, also components of unit 35, are energized from divider 39 and in turn supply a sampling pulse generator 43, the principal function of which is to provide 6.25-kilocycle sampling pulses to sampler unit 23.

Sampling pulse generator 43 also supplies a blanking pulse and sweep generator 44, one output of which, represented by curve 3 of FIG. 3, is passed through a horizontal deflection amplifier 45 and utilized to provide the horizontal deflection of the electron beam in the coding tube of unit 25. Another output of unit 44 serves to blank out the electron beam in the coding tube of unit 25 during the retrace interval.

The output of gate 38 is supplied to a pulse generator 46 followed by a cathode follower unit 47. The 25-kilocycle output of unit 47 is utilized to actuate gate 28 and is also supplied to an autokey control gate 48.

The output of cathode follower unit 40 (curve 15) is supplied to first and second autokey generators 49 and 50, and also to a peaker unit 51, the output of which comprises a storage reset signal illustrated by curve 2 and furnished to each of autokey generators 49 and 50.

For the purpose of providing the first autokey code to be supplied to first cipher text generator 27, a connection is made from the output of gate 28 through a peaker unit 52 to first autokey generator 49, and the output of this autokey generator is passed through an autokey slicer 53 and then supplied to first cipher text generator 27.

For the purpose of providing the second autokey code, a connection is made from the output of second cipher text generator 29 (curve 4) to a peaker unit 54, the output of which has a waveform shown by curve 5, this output being supplied to second autokey generator 50. The output of the latter generator is in turn supplied through autokey control gate 48 to second cipher text generator 29, the gated autokey signal thus supplied being illustrated by curve 16.

With the system as thus far described, excellent security would be achieved if speech were being continually transmitted. If there are long periods of silence, however, the two most frequent counts appearing in the plain text binary code at the output of slicer unit 26 would be seven and eight, corresponding to the first level below and the first level above the no-signal point in the coding tube of unit 25. In order to enhance the security of the system, a low-level random noise signal is developed by a random noise generator 55 and injected into the speech channel after filter 21 but before limiter-compressor unit 22. The amplitude of this noise signal is adjusted so as to give a minimum signal-to-noise ratio consistent with intelligible communication and, in general, will be of sufficient amplitude to modulate the coding tube over the middle four levels, that is, the counts of six, seven, eight and nine. Due to the action of limiter-compressor unit 22, noise from generator 55 has a level substantially below the maximum level of the intelligence signal, as for example 30 decibels, and therefore introduces no objectionable effects into the speech path. Noise generator 55 may be of any suitable type, as for example an arrangement employing a gas tube as the source of random noise.

If it is desired to increase the security of the system, this is readily done by adding one or more additional autokey generators, as indicated by unit 56 shown in broken lines. It will be understood, of course, that additional auxiliary units such as re-entry and peaking circuits, although not shown, will also be necessary. The degree of additional security which may be realized will be readily apparent when it is pointed out that a system employing a single autokey generator requires that the decipherer make a choice from factorial 16 possible solutions; the use of two autokey generators requires that the choice be made from factorial 256 possible solutions; and the use of three autokey generators would require a selection from a possible factorial 65,536 possible solutions.

On the other hand, if relatively limited security is required, with maximum compactness and minimum weight, only a single autokey generator and its associated circuits need be used. In this case, the first coded text code of FIG. 1 is directly utilized to modulate the transmitter. It is an important feature of the present invention thus to make available to the user a choice over a wide range of the degree of security achieved, this choice depending upon space and weight requirements and being readily altered merely by the addition or subtraction of several substantially identical units.

The Autokey Generator

Figure 2:
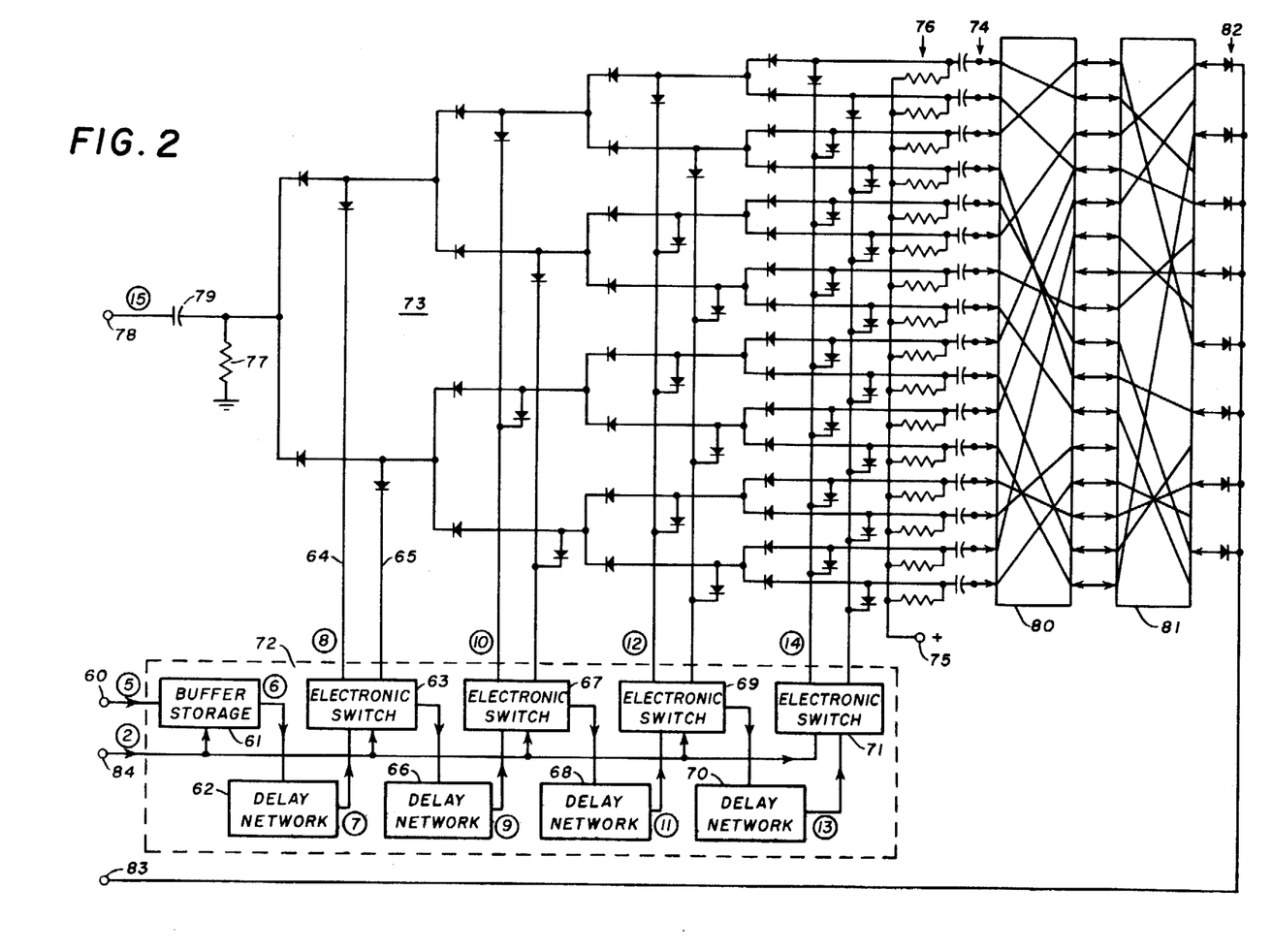
FIG. 2 is a schematic diagram, partly in block form, representing an autokey generator of the type utilized in the system of FIG. 1.

FIG. 2 of the drawings is a schematic diagram, partly in block form, of an autokey generator of the type utilized in the system of FIG. 1. Autokey generators 49 and 50 of that Figure are identical in their internal circuit arrangements. For the purpose of illustration, however, autokey generator 50 is illustrated in FIG. 2 of the drawings. The purpose of the autokey generator is to provide an autokey code comprising a train of pulses, for combination in the cipher text generators with the plain text binary code or with the first coded text code. In order that these pulses may be randomly disposed, an arrangement is provided in accordance with the present invention for developing a pulse train in which the disposition of the pulses is a function of the nature of the four preceding binary digits of the code at the output of the re-entry circuit. In this connection, it is pointed out that the choice of four preceding digits instead of some other number of preceding digits is entirely arbitrary, being based principally upon considerations of compactness and complexity.

The output of peaker unit 54 of FIG. 1, as represented by curve 5 of FIG. 3, is applied to input terminal 60 of buffer storage unit 61, the purpose of which is to delay and elongate each pulse, as indicated by curve 6 of FIG. 3 representing the output of unit 61. This output is supplied to a delay network 62, the output of which is illustrated by curve 7.

The delayed pulse output of delay network 62 is utilized to actuate an electronic switch unit 63, which is preferably a trigger circuit of the Eccles-Jordan type. Unit 63 has two outputs, represented by leads 64 and 65, and the potentials on these leads alternate in value between two voltages. The potential on lead 64 is indicated by curve 8 of FIG. 3.

A connection is also made from unit 63 to a delay network 66, the output of which, represented by curve 9, is supplied to a second electronic switch unit 67, one output of which is represented by curve 10. Another output of unit 67 is supplied to a delay network 68, the output of which (curve 11) is supplied to a third electronic switch unit 69 having an output represented by curve 12. Unit 69 supplies a delay network 70 which has an output indicated by curve 13 and which serves to actuate a fourth electronic switch unit 71. One output of unit 71 is represented by curve 14.

Each of delay networks 62, 66, 68 and 70 preferably has a delay time of approximately two microseconds. Each stage of delay, comprising an individual delay network and an electronic switch unit, preferably provides a delay of 40 microseconds, which corresponds with the time interval of one binary digit.

The multiple delay network represented generally by 72 of FIG. 2 and including the components just described comprises in essence a group of four double-pole, double-throw electronic switches which are practically instantaneous in operation. These switches are used to control the operation of a diode matrix indicated generally at 73. Such a matrix employs a plurality of rectifier elements, which may preferably be of the germanium diode type. The details of the matrix form no part of the present invention. A matrix suitable for use in the system of the present invention is described in a paper entitled "Rectifier Networks for Multi-Position Switching" by D. R. Brown and N. Rochester, appearing at pages 139–147 of the Proceedings of the I.R.E. for February 1949.

Matrix 73 has a total of sixteen separate output terminals indicated generally at 74, and the purpose of the matrix is to determine at which single one of these terminals an output pulse is to appear during the interval corresponding to each binary digit. The output pulse thus appearing at a selected output terminal results from the application of a suitable source of positive potential to terminal 75, which in turn causes a potential drop across one of the output resistors indicated collectively by 76 and across resistor 77, the lower terminal of which is grounded as indicated.

The differential between the selected and unselected outputs of the matrix is dependent upon the back and front resistances of the rectifiers employed. Since these resistances are respectively neither infinite nor zero, this differential is preferably increased by applying a square wave, synchronized with the delay network output wave, across resistor 77. This is accomplished by applying to terminal 78 the potential represented by curve 15 of FIG. 3, which is developed at the output of cathode follower unit 40 of FIG. 1. Each positive half cycle of this square wave raises the voltage across resistor 77, which in turn raises the voltage on the selected output lead. Terminal 78 is coupled to the upper terminal of resistor 77 by a capacitor 79.

In order further to enhance the secrecy of the system, the output pulse appearing at one of output terminals 74 of matrix 73 is not utilized directly, but is first passed through one or more cross-wired key-setting wheels, two of which are indicated diagrammatically at 80 and 81. These wheels, which may readily be arranged for rotation to alter the type of coding being developed, effectively shift the relative position of the selected output terminal in the sequence of the autokey code. If desired, differently wired wheels may be substituted still further to increase the number of different autokey codes available. For a given selection of wheels, additional security may be achieved by subjecting them to rotational stepping at predetermined intervals at the same or different rates. Only alternate outputs of wheel 81 are picked off, and these are passed through mixer-rectifiers collectively indicated at 82 and connected together to provide a common autokey output at terminal 83. Thus the single active output of the matrix will be routed through the cross-wired wheels according to the wheel settings and will terminate either on output terminal 83, producing a mark, or at an open circuit, resulting in a space at terminal 83. Summarizing, the settings of multiple delay network 72 determine which one of the sixteen matrix outputs is active, and the cross-wired wheel settings determine whether this output gives a mark or a space at autokey output terminal 83.

A suitable cross-wired wheel is disclosed and claimed in the copending application of Pierre J. Tapernoux, Ser. No. 199,671, filed Dec. 7, 1950, and assigned to the same assignee as the present invention.

Figure 4:
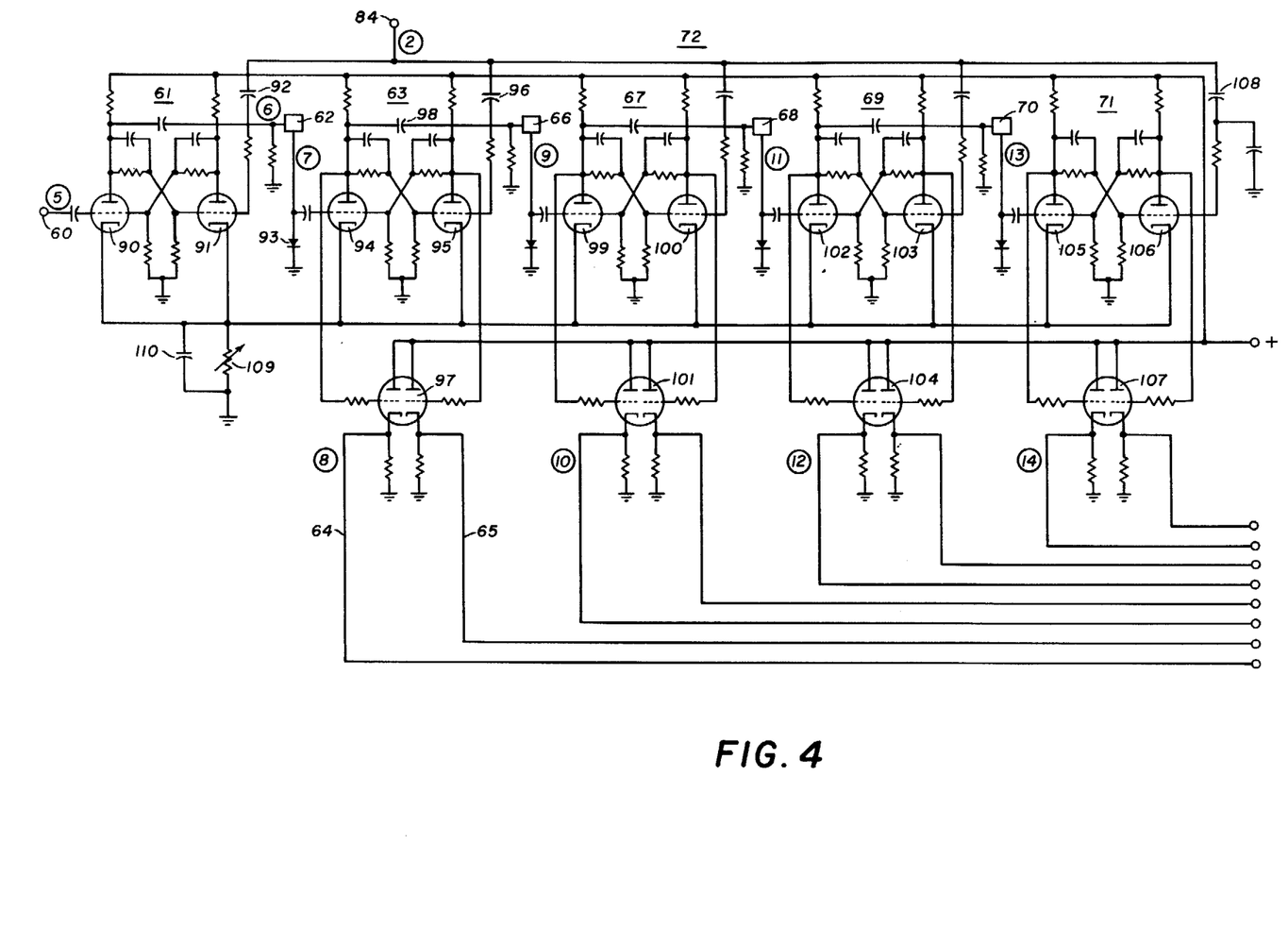
FIG. 4 is a schematic diagram of a multipe delay network of a type suitable for use in the system of FIGS. 1 and 2.

For the purpose of initially adjusting each of electron discharge devices 90, 91, 94, 95, 99, 100, 102, 103, 105 and 106 to their optimum operating points, there is provided an adjustable resistance 109 shunted by a capacitor 110 in the common path between the cathodes of these discharge devices and ground. An initial adjustment of resistance 109 is normally all that is required until the discharge devices are replaced by new ones.

One of the important features of the multiple delay network in accordance with the present invention is that information comprising a space will be stepped along the chain in its proper time sequence, in exactly the same manner as would result if the information were a mark. This desirable result is achieved by resetting each stage of the multiple delay network following each digit interval, this being done by applying a reset pulse at an appropriate time to each of the cascaded trigger circuits. A multiple delay network of the type herein disclosed provides substantially distortionless delay without the introduction of attenuation, even when a long delay interval is required. This is accomplished with a compact and efficient arrangement of components, which readily provides delays varying from a few microseconds to very much higher values depending merely upon the periodicity of the reset pulse wave.

The Cipher Text Generator

Figures 5, 8:
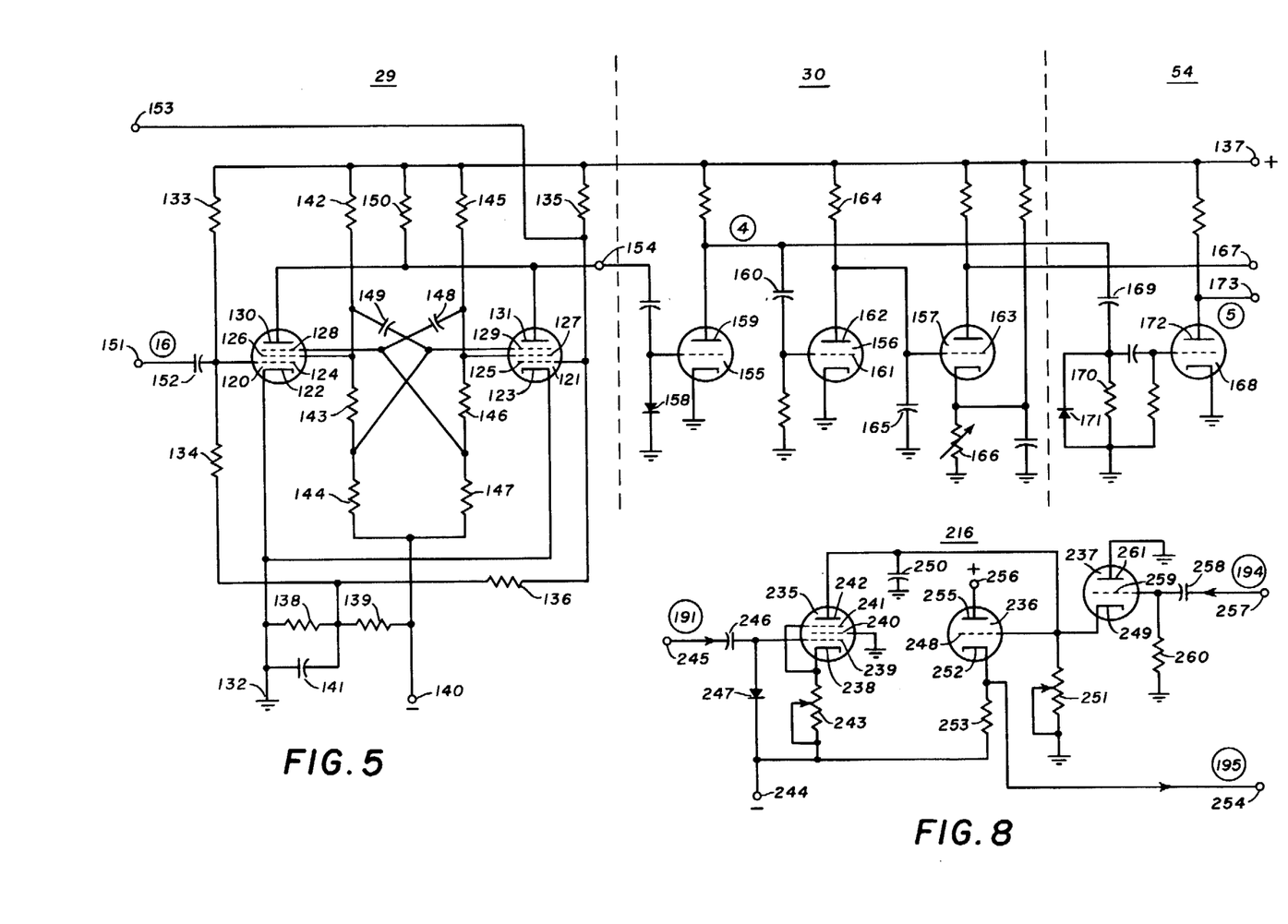
FIG. 5 is a schematic diagram of a cipher text generator and associated circuits suitable for use in the system of FIG. 1.
FIG. 8 is a schematic diagram of a converter suitable for use in the system of FIG. 6.

FIG. 5 is a schematic diagram of a cipher text generator suitable for use in the system of FIG. 1. Although cipher text generators 27 and 29 of FIG. 1 are substantially identical in their internal circuit arrangements, for purposes of illustration generator 29 and its associated circuits are shown in FIG. 5. These associated circuits include pulse widener 30 and peaker unit 54 of FIG. 1. A cipher text generator may be referred to as a re-entry circuit.

As shown in FIG. 5, cipher text generator 29 comprises a pair of electron discharge devices 120 and 121, preferably of the pentode type such, for example, as Western Electric type 6AS6, and having respectively cathodes 122 and 123, control electrodes 124 and 125, screen grids 126 and 127, suppressor grids 128 and 129, and anodes 130 and 131. Cathodes 122 and 123 are grounded as indicated at 132. Control electrodes 124 and 125 are normally maintained at a potential somewhat positive with respect to that of cathodes 122 and 123 by means of individual dividing networks comprising respectively resistors 133 and 134, and resistors 135 and 136, these dividing networks being connected between a source of positive potential 137 and the junction of resistors 138 and 139, connected in series between ground at 132 and a source of negative potential 140. The junction of resistors 138 and 139 is by-passed to ground by a capacitor 141.

Screen grids 126 and 127 are normally maintained at a potential positive with respect to cathodes 122 and 123 by individual dividing networks comprising resistors 142, 143 and 144, and resistors 145, 146 and 147, these networks being connected between positive potential source 137 and negative potential source 140. Suppressor grid 128 of discharge device 120 is connected to the junction of resistors 146 and 147, and is coupled by means of a capacitor 148 to screen grid 127 of discharge device 121. Similarly, suppressor grid 29 of discharge device 121 is connected to the junction of resistors 143 and 144, and is coupled by a capacitor 140 to screen grid 126 of discharge device 120. Anodes 130 and 131 are connected through a common load resistor 150 to positive potential source 137.

A first input terminal 151 is coupled by means of a capacitor 152 to control electrode 124 of discharge device 120. A second input terminal 153 is connected to control electrode 125 of discharge device 121. An output terminal 154 is connected to anodes 130 and 131 of discharge devices 120 and 121.

In operation, let it first be assumed that no input signal is being applied to either of input terminals 151 and 153. Under this condition, control electrodes 124 and 125 are positive with respect to cathodes 122 and 123, and discharge devices 120 and 121 are both highly conductive. In actual practice, however, this condition does not exist, since trains of positive pulses are applied to each of input terminals 151 and 153, the gated autokey pulses (curve 16) from autokey control gate 48 (FIG. 1) being applied to terminal 151 and the first coded text code, after gating in unit 28 (FIG. 1), being applied to terminal 153. These positive pulses occur frequently enough and are of sufficient magnitude to render each of discharge devices 120 and 121 normally non-conductive between pulses due to grid rectification. Thus, when no pulse is present at either input terminal, no output pulse is developed at output terminal 154. In other words, spaces in both input codes result in a space in the output code.

Now let it be assumed that a positive input pulse, corresponding to a mark in the gated autokey code, is present at input terminal 151. This pulse momentarily drives control electrode 124 positive with respect to cathode 122, thereby rendering discharge device 120 conductive. The resultant anode current causes a potential drop across load resistor 150, producing a negative output pulse at output terminal 154. Similarly, a positive pulse at input terminal 153 renders discharge device 121 momentarily conductive and produces a negative output pulse at output terminal 154. Thus it will be apparent that, if a mark is present in the code applied at input terminal 151 simultaneously with a space in the code applied to terminal 153, or vice versa, an output mark is obtained at output terminal 154.

Now let it be assumed that positive pulses are present simultaneously at input terminals 151 and 153. Under this condition, the positive pulse at terminal 151 causes discharge device 120 to become conductive, thereby causing its screen grid 126 to draw current. This in turn causes a potential drop across resistor 142 and, due to the action of coupling capacitor 149, causes the potential of suppressor grid 129 of discharge device 121 to swing sufficiently in a negative direction to keep anode current in discharge device 121 from flowing, which it would otherwise normally do because of the presence of the positive pulse at input terminal 153. At the same time, the flow of screen-grid current in discharge device 121 causes a potential drop across resistor 145 and thereby renders suppressor grid 128 of discharge device 120 sufficiently negative, due to the action of coupling capacitor 148, so that anode current in discharge device 120 is not permitted to flow. It will be apparent, therefore, that the presence of input pulses or marks simultaneously on input terminals 151 and 153 will not result in the production of any output pulse or mark at output terminal 154.

The output pulse wave developed at output terminal 154 is passed through inverter and pulse widener unit 30 comprising electron discharge devices 155, 156 and 157. A rectifier 158 is shunted across the input circuit of device 55, and effectively suppresses any positive swings which may be present in the pulse wave at terminal 154. Discharge device 155 functions as an inverter, the inverted pulse train (curve 4) developed at its anode 159 being supplied to peaker unit 54 and, through a capacitor 160, to control electrode 161 of discharge device 156. Anode 162 of discharge device 156 is connected directly to control electrode 163 of discharge device 157. Pulse widening is obtained by the integrating action of load resistor 164, in the anode circuit of discharge device 156, and capacitor 165 connected between control electrode 163 and ground. The degree of pulse widening achieved is readily adjusted by means of a variable resistance 166 in the cathode circuit of discharge device 157. The widened pulse train, developed in the anode circuit of device 157, is fed to an output terminal 167, and is then supplied to transmitter 31 (FIG. 1).

Peaker unit 54 comprises an electron discharge device 168, whose input is obtained from a differentiating network comprising a capacitor 169 and a resistor 170. The latter element is shunted by a rectifier 171, the purpose of which is to eliminate any undesired negative swings in the peaked pulse train. The anode 172 of discharge device 168 is connected to an output terminal 173, the pulse wave at this terminal, illustrated by curve 5 of FIG. 3, being supplied to autokey generator 50 (FIG. 1).

The Receiving System

Figure 6:
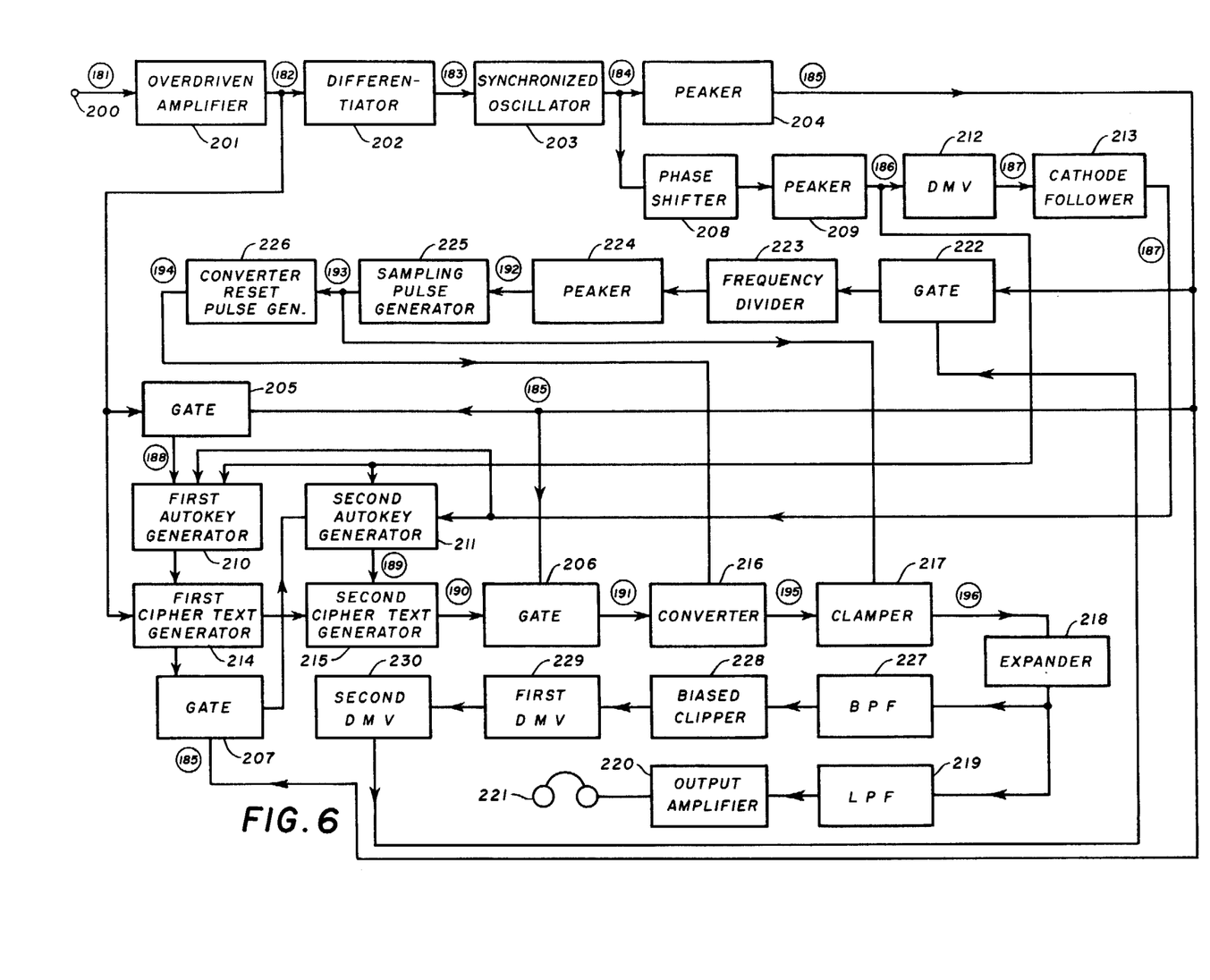
FIG. 6 is a block diagram of a system, in accordance with the present invention, at the receiving terminal.

FIG. 6 is a block diagram of a system, in accordance with the present invention, for use at the receiving terminal. It will first be assumed that the receiving system is operating in proper synchronization with the transmitting system. The operation of the synchronizing system will then be discussed separately.

The output of the receiver itself (not shown) is a wave such as that illustrated by curve 181 of FIG. 7, and is applied, at an input terminal 200, to an overdriven amplifier 201, in which the signal wave is subjected to slicing. The output (curve 182) of amplifier 201 is passed through a differentiator 202, forming the pulse train of curve 183. This pulse train, in which the 25-kilocycle pulse repetition rate is predominant although every pulse is not necessarily present, is employed to control the operation of an oscillator 203 adapted to operate at a frequency of 25 kilocycles per second, providing an output indicated by curve 184.

The output of oscillator 203 is passed through a peaker unit 204 to provide a 25-kilocycle pulse train (curve 185) which is supplied to gates 205, 206 and 207, the functions of which will be described later. The output of oscillator 203 is also passed through a phase shifter 208 and a peaker unit 209, to provide a suitably delayed pulse train as illustrated by curve 186. These delayed pulses are supplied as reset pulses to first and second autokey generators 210 and 211. The delayed pulses (curve 186) are lengthened in a delay multivibrator unit 212, which may have a period of operation of 30 microseconds, and the lengthened pulses (curve 187) are passed through a cathode follower unit 213 and supplied to first and second autokey generators 210 and 211.

The output of amplifier 201 (curve 182) is also supplied to gate 205 and to a first cipher text generator 214. Pulse train 185, after being gated in gate 205, is supplied to first autokey generator 210 and is represented by curve 188. The output of first autokey generator 210 is combined, in first cipher text generator 214, with the output of amplifier 201 (curve 182). The resultant pulse train is supplied directly to a second cipher text generator 215 and, through gate 207, to second autokey generator 211. The output of second autokey generator 211 (curve 189) is supplied to second cipher text generator 215. The output of generator 215 (curve 190) is utilized in gate 206 to gate the 25-kilocycle pulse train (curve 185) and produce the train represented by curve 191. The latter wave constitutes plain text, which is supplied to a converter unit 216. Converter unit 216 is periodically reset in a manner later to be described. The output of converter unit 216 (curve 195) is passed through a clamper unit 217, which is periodically actuated in a manner described below, resulting in a waveform such as that represented by curve 196. A suitable clamper unit for this purpose is disclosed and claimed in copending application Ser. No. 121,001, Beryl L. McArdle, filed Oct. 12, 1949, and assigned to the same assignee as the present application. The resultant wave, after being passed through an expander unit 218 and a low-pass filter 219, is amplified in amplifier 220 and supplied to a transducer represented diagrammatically as head telephone 221.

Several components of the receiving system of FIG. 6 are identical with the corresponding units of the transmitting system of FIG. 1. Gate 207 is the equivalent of gate 28. First and second autokey generators 210 and 211 are identical with autokey generators 49 and 50. First and second cipher text generators 214 and 215 correspond with cipher text generators 27 and 29. In a two-way system, single units may be used alternately for transmitting and receiving, if desired, in order to minimize bulk. Since the transmitting system utilizes two coding stages, two stages are necessarily employed in the receiving system. It is within the scope of the invention, however, to use only a single coding stage or more than two stages if desired, depending upon the degree of security required and the permissible weight and bulk. The number of stages is readily altered merely by changing the numbr of autokey generators and associated apparatus at both the transmitted and the receiving terminals.

For the purpose of developing sampling and converter reset pulses, the output of peaker unit 204 (curve 185) is supplied to a normally open gate 222. The output of gate 222 is passed through a frequency divider unit 223, which is preferably of the two-stage binary type providing a division by four. The resultant pulse train is passed through a peaker unit 224 so that it has the shape indicated by curve 192. This pulse train is used to trigger a sampling pulse generator 225, producing the slightly delayed sampling pulses indicated by curve 193, these pulses being supplied to clamper unit 217. The output (curve 193) of sampling pulse generator 225 is also used to trigger a converter reset pulse generator 226, which provides a pulse train (curve 194) of pulses which are delayed in time with respect to the sampling pulses of curve 193. The delayed reset pulses are supplied to converter unit 216.

Frequency divider 223, peaker unit 224 and sampling pulse generator 225 of the receiving system may be respectively identical with frequency divider 35, peaker unit 37 and sampling pulse generator 43 of the transmitting system of FIG. 1. Converter unit 216 will be described later.

The Synchronizing System

The mark-space information which is transmitted by the system of FIG. 1 and received by the system of FIG. 6 contains no synchronizing information except the pulse repetition frequency which, for example, may occur at 25 kilocycles per second. The receiving system as thus far described is capable of locking into step with the pulse repetition frequency of the transmitted signals, but additional means must be provided so that the receiver will systematically search out and subsequently lock into the proper one of the four possible phase relationships with the transmitter which exist because each sample of the intelligence wave is represented by a set or group comprising four binary digits. The correct phase is the one in which each 6.25-kilocycle sampling pulse (curve 193) occurs immediately following the fourth pulse interval of the binary code plain text. In order to achieve this proper phasing, in accordance with the present invention, advantage is taken of the fact that, when the phasing is proper, the low-level noise code groups (corresponding with values of 6, 7, 8 and 9 of the 16 discrete sampling levels) are decoded as low-level noise, whereas the converter output will be high-level random noise in each of the other three possible phasings. This information is used to control the search function of the synchronizing portion of the receiving system.

For the purpose of achieving proper synchronization, the output of expander unit 218 is supplied to a bandpass filter 227 which preferably passes a band of frequencies lying above the voice frequencies to be transmitted, as for example a pass band of 3000 to 4000 cycles. The purpose of this filter is to prevent operation of the synchronizing portion of the system in the presence of transmitted speech. The output of filter unit 227 is supplied to a biased clipper unit 228 which discriminates between high-level and low-level noise, providing an output only when high-level noise is present at its input.

The output of clipper unit 228 is utilized to trigger a first delay network such as delay multivibrator 229, which has a delay time sufficiently long to allow several of the binary code groups to be decoded. This delay time, for example, may be approximately one millisecond. The purpose of introducing this delay is to prevent a second triggering of multivibrator 229 in the event that the system is already operating in the proper phase. Under these circumstances, the output of clipper unit 228 is given an opportunity to drop to zero, the value corresponding to the condition of proper phasing. Each time that first delay multivibrator 229 is triggered, a second delay network such as multivibrator 230 having a much shorter delay time, which may for example be approximately 40 microseconds, is triggered. The output of second delay multivibrator 230 serves to render gate 222 inoperative or non-conductive for a time interval corresponding with one pulse of the 25-kilocycle pulse train (curve 185) from peaker unit 204. The blocking of one such pulse by gate 222 shifts the 6.25-kilocycle pulses developed at the output of frequency divider 223 by a time corresponding to one sampling pulse interval. As long as high-level noise is present at the output of converter unit 216, second delay multivibrator 230 will continue to trigger and cause the 6.25-kilocycle pulse train (curve 192) to shift phase or search until the correct phase position has been achieved. Once the correct position has been reached, however, second delay multivibrator 230 will no longer be triggered, and the receiving system will be locked into the proper phase relation with the incoming signals.

The Converter

FIG. 8 is a schematic diagram of converter unit 216 of the receiving system of FIG. 6. Converter 216 comprises electron discharge devices 235, 236 and 237. Device 235 is preferably of the pentode type having a cathode 238, a control electrode 239, a screen grid 240, a suppressor grid 241, and an anode 242. Cathode 238 and suppressor grid 241 are connected together and, through an adjustable resistance 243, to a source of negative potential indicated at 244. The input plain text signal comprising a train of positive pulses (curve 191) is supplied to an input terminal 245, which is coupled by a capacitor 246 to control electrode 239. A rectifier 247, preferably of the crystal type, is connected between control electrode 239 and negative potential terminal 244, its purpose being to limit the amplitude of the positive pulses which are supplied to control electrode 239.

Screen grid 240 is grounded as indicated. Anode 242 is connected to control electrode 248 of electron discharge device 236, and to cathode 249 of discharge device 237. A capacitor 250 is connected between anode 242 and ground. An adjustable resistance 251 is connected between control electrode 248 and ground.

Cathode 252 of discharge device 236 is connected through a resistor 253 to negative potential terminal 244, and also to output terminal 254, which supplies the output waveform (curve 195) to clamper unit 217 (FIG. 6). Anode 255 of discharge device 236 is connected to a source of positive potential indicated at 256. A terminal 257, to which are supplied the reset pulses (curve 194) as developed by converter reset pulse generator 226 (FIG. 6), is coupled by a capacitor 258 to control electrode 259 of discharge device 237. A resistor 260 is connected between control electrode 259 and ground. Anode 261 of discharge device 237 is grounded as indicated.

In operation, the application of a positive pulse to input terminal 245 renders electron discharge device 235 conductive, so that capacitor 250 is charged in a negative direction from negative potential source 244. The amplitude or degree to which capacitor 250 is charged by each pulse may be adjusted by means of variable resistance 243.

Upon the termination of each such positive input pulse, discharge device 235 becomes non-conductive and capacitor 250 gradually discharges through adjustable resistance 251. The rate at which this discharge takes place depends upon the time constant of capacitor 250 in combination with adjustable resistance 251, and may be varied by adjusting the latter element. In a preferred embodiment of the invention, in which the intelligence is transmitted in binary code groups, the adjustment must be such that one-half of the charge on capacitor 250 is removed in each pulse interval.

At the end of each sampling interval, comprising four binary digit intervals, capacitor 250 is substantially completely discharged by the application of a positive resetting pulse (curve 194) to terminal 257. These resetting pulses render conductive electron discharge device 237, which is normally nonconductive, so that the ungrounded terminal of capacitor 250 is effectively brought to ground potential and thus the capacitor is substantially completely discharged.

In order to develop an output voltage which is a function of the state of charge of capacitor 250 without appreciably loading the charge and discharge circuits associated with this capacitor, electron discharge device 236 is arranged to function as a cathode follower, its control electrode 248 following the potential across capacitor 250 and a corresponding output potential being developed across cathode load resistor 253, which may be of relatively low impedance. This output voltage (curve 195) is supplied to terminal 254 and thence to clamping unit 217 (FIG. 6).

It will be apparent that the converter just described has the advantage that it is automatically reset at the end of each sampling interval, and is thus practically instantly made ready for the binary code information to be supplied to it by the immediately following binary code group. Such an arrangement has been found to be definitely superior to one in which the charge storage means must be permitted an appreciable time interval in which to recover from decoding each binary digit group before it is in readiness to receive the next such group.

General

While there has been described what is at present considered the preferred embodiment of the present invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An autokey generator adapted for use in a secret communication system, comprising the combination of a source of binary digit pulse intelligence signals in digital mark-space form having a predetermined number of digital pulse intervals in each intelligence signal interval; a plurality of bistable switch means connected in sequence, each said switch means having a tripped state and a reset state, a source of reset signals connected to each of said switch means, said reset signals occurring at the end of each digit interval; means for tripping the first said switch means in response to the receipt of a mark pulse from said source of intelligence signals; means for setting each said switch means, except the first, in accordance with the state of the preceding said switch means upon the receipt of a said reset pulse, each said switch means having at least a pair of output terminals furnishing output signals of opposite polarity; diode matrix means having a plurality of output terminals, responsive to the respective outputs of said switch means for energizing individual ones of said output terminals in correspondence with particular combinations of output signals from said switch means, said matrix means being operated to pass said output signals from said switch means to one of said output terminals at a given instant, depending uniquely upon the configuration of polarities then present on said output terminals of said switch means, an autokey code output terminal, and means for connecting fewer than all of said output terminals of said matrix means in parallel to said autokey code output terminal, whereby said autokey code appearing on said autokey code output terminals contains a pattern of pulses determined by, but different from, the pattern of pulses appearing in said intelligence signals.

2. The combination of claim 1 in which each said switch means is an electronic switch.

3. The combination of claim 1 in which said means for connecting said matrix means to said autokey code output terminal includes a cross-wired key setting wheel.

4. The combination of claim 1 in which said source of intelligence signals includes means for generating random noise, means for accepting speech and other desired signals, and means for adding said random noise to said desired signals before sampling and conversion into said binary digit pulse intelligence signals.

* * * * *